United States Patent
Doi

(10) Patent No.: US 7,305,235 B2
(45) Date of Patent: Dec. 4, 2007

(54) ANTENNA DIRECTIVITY CONTROL METHOD AND RADIO APPARATUS

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 387 days.

(21) Appl. No.: 10/221,185

(22) Filed: Sep. 20, 2002

(65) Prior Publication Data

US 2003/0045233 A1    Mar. 6, 2003

(30) Foreign Application Priority Data

Mar. 22, 2000  (JP) ............................. 2000-80605

(51) Int. Cl.
  H04B 1/00  (2006.01)
  H04Q 7/20  (2006.01)
  H01Q 3/00  (2006.01)
(52) U.S. Cl. .................. 455/424; 455/423; 455/63.4; 342/368; 342/371
(58) Field of Classification Search ........... 455/423, 455/424, 425, 63.4, 522, 70, 63.1, 562.1; 342/368, 371, 360, 365, 367
See application file for complete search history.

(56) References Cited

U.S. PATENT DOCUMENTS 6,564,036 B1 * 5/2003 Kasapi ...................... 455/1

6,836,673 B1 * 12/2004 Trott ....................... 455/562.1

FOREIGN PATENT DOCUMENTS

| JP | 2000-82987 | 3/2000 |
|---|---|---|
| JP | 2001-148656 | 5/2001 |
| WO | WO 99/40689 | 8/1999 |

OTHER PUBLICATIONS

B. Widrow et al.; Proceedings of the IEEE, vol. 55, No. 12, pp. 2143-2159, Dec. 1967. Discussed in the spec.
S. P. Applebaum; IEEE Transactions on Antennas and Propagation, vol. AP-24, No. 5, pp. 585-598, Sep. 1976. Discussed in the spec.
B. Widrow et al.; Adaptive Signal Processing; Chapter 6, pp. 99-116, 1985. Discussed in the spec.
R. A. Monzingo et al.; Introduction to Adaptive Arrays, A Wiley-Interscience Publication, Chapter 3, pp. 78-105, 1980. Discussed in the spec.

(Continued)

Primary Examiner—Matthew Anderson
Assistant Examiner—Yuwen Pan
(74) Attorney, Agent, or Firm—Westerman, Hattori, Daniels & Adrian, LLP.

(57) ABSTRACT

A connection request signal issued from a terminal (PS2) corresponding to a new call and received by an array antenna (2) is supplied to an adaptive array (14) and a parameter estimating unit (15). The parameter estimating unit (15) lowers a send power of a terminal (PS1) corresponding to an existing call by a predetermined level when it is detected from an output of the adaptive array (14) and a signal supplied from the antenna (2) that the connection request signal is received via a C-channel.

14 Claims, 13 Drawing Sheets

OTHER PUBLICATIONS

J. E. Hudson, IEE Electromagnetic Wave Series II, Chapter 3, pp. 59-154.

R. T. Compton, Jr., Adaptive Antennas, The Ohio State Univ., Prentice Hall, vol. 2, pp. 6-11, 1988. Discussed in the spec.

E. Nicolau et al.; Adaptive Arrays, ELSEVIER, Chapter 8, pp. 122-163, 1989. Discussed in the spec.

Association of Radio Industries and Businesses—RCR STD-28, Dec. 1993.

D. Tanaka et al.; Blocking Rate Performance of SDMA with a 3-element Adaptive Array; The Institute of Electronics; English abstract, 1998.

* cited by examiner

ANTENNA DIRECTIVITY CONTROL METHOD AND RADIO APPARATUS

DESCRIPTION

1. Technical Field

The present invention relates to a method of controlling antenna directivity in a Spacial Division Multiple Access (SDMA) communication system as well as a radio apparatus for a base station using the same.

2. Background Art

A communication system, which uses a PHS (Personal Handy-phone System) and has been widely used in recent years, employs a TDMA (Time Division Multiple Access) system, in which a frame of 5 ms (milliseconds) formed of four slots (1 slot=625 μs) is used as a basic unit for sending and receiving. The communication system using the PHS is already standardized as a "Second-Generation Cordless Telephone Conversation System".

In this PHS, processing of measuring interference waves or undesired wave (U-waves) is performed during a control procedure for establishing synchronization. The measurement of undesired waves is specifically disclosed in "2nd-Generation Cordless Telephone Conversation System Standards RCR STR-28" (issued by Association of Radio Industries and Businesses) specifying the standards of the PHS.

FIG. 12 illustrates a sequence flow of such processing of measuring U-waves. Referring to FIG. 12, brief description will now be given on such processing.

First, a PHS terminal sends a link channel establishment request signal to a base station via a C-channel. The PHS base station detects an unused channel (unused T-channel) (i.e., performs carrier sensing), and sends a link channel allocation signal (LCH allocation signal) designating the unused T-channel to the PHS terminal side via the C-channel.

On the PHS terminal side, the U-wave measurement is performed based on the link channel information received from the PHS base station by determining whether the designated T-channel receives an interference wave signal of a predetermined power or higher, or not. When the interference wave signal of a predetermined power or higher is not detected, i.e., when another PHS base station is not using this designated T-channel, the synchronous burst signal is sent to the base station via the designated T-channel, and the synchronization is established.

When the interference wave signal of a predetermined power or higher is detected on the designated T-channel, i.e., when another PHS base station is using the designated T-channel, the PHS terminal will repeat the control procedure starting from sending of the signal requesting the link channel establishment.

In the conventional PHS, a connection is achieved between the terminal and the base station via a communication channel, which can suppress an interference wave and can achieve good communication characteristics.

In recent years, another system using the SDMA communication technology has been proposed for providing signals with reduced noises and waveform distortion and improving a utilization efficiency of the channel by allocating a single channel to multiple users in the same cell.

In the SDMA communication system, an adaptive array using an array antenna is used as a base station. Operation principles of the adaptive array radio base station are disclosed, e.g., in the following references.

B. Widrow, et al.: "Adaptive Antenna Systems", Proc. IEEE, Vol. 55, No. 12, pp. 2143-2159 (December 1967).

S. P. Applebaum: "Adaptive Arrays", IEEE Trans. Antennas & Propag., Vol. AP-24, No. 5, pp. 585-598 (September 1976).

D. L. Frost, III: "Adaptive Least Squares Optimization Subject to Linear Equality Constraints," SEL-70-055, Technical Report, No. 6796-2, Information System Lab., Stanford Univ. (August 1970).

B. Widow and S. D. Stearns: "Adaptive Signal Processing", Prentice-Hall, Englewood Cliffs (1985).

R. A. Monzingo and T. W. Miller: "Introduction to Adaptive Arrays", John Wiley & Sons, New York (1980).

J. E. Hudson: "Adaptive Array Principles", Peter Peregrinus Ltd., London (1981).

R. T. Compton Jr.: "Adaptive Antennas—Concepts and Performance", Prentice-Hall Englewood Cliffs (1988).

E. Nicolau and D. Zaharia: "Adaptive Arrays", Elsevier, Amsterdam (1989).

The radio wave, which is sent and received by the adaptive array, has a directivity in a predetermined direction, and the directivity of the radio wave area can be directed toward a mobile terminal.

In the SDMA system, it is possible to allocate the same channel to a plurality of users in the same cell as already described, and the contents of this technique are specifically disclosed in "Blocking Rate Performance of SDMA with a 3-element Adaptive Array" by Daisuke TANAKA et al. (Technical Report of IEICE A. pp. 97-214, RCS97-252, MW97-197 (1998-02)) issued by the Institute of Electronics, Information and Communication Engineers, and others. The SDMA system is also referred as a PDMA (Path Division Multiple Access) system.

FIG. 13 conceptually shows terminals in communication with an SDMA base station. As shown in FIG. 13, the SDMA communication technology is used in the PHS base station using the adaptive array so that one SDMA-PHS base station 71 can accommodate a plurality of PHS terminals PA-PF.

In FIG. 14, the adaptive array is used, and the directivity in only one direction is conceptually represented. In this case, the directivity of the radio wave area can be set in a designated direction (main direction). At the same time, however, unnecessary radiation (directive radio wave area in a secondary direction) occurs from the radio wave area having the directivity in the designated direction. For example, if the directivity is formed as indicated by 73a, unnecessary radiation occurs in hatched regions 73b and 73c.

Accordingly, if a connection request for a new call is made in the direction where the unnecessary radiation is present, this unnecessary radiation is observed as an interference wave acting on the new-call terminal, i.e., the terminal making the new call.

In an SDMA communication system, as disclosed in Japanese Patent Laying-Open No. 10-269603, when a multiplexer channel is to be allocated to a terminal making a new call, a sending directivity for an existing call is controlled to direct a null direction of the radio wave area toward the new call so that the signal sent to the existing-call terminal, i.e., terminal making the existing call may not be determined as an interference wave in the carrier sense performed by the new-call PHS terminal.

However, when the position of the new call is near the base station, the level of radio wave radiated to a terminal PS2 making a new call cannot be lowered to or below a specified level even if the directivity of the radio wave area of a terminal PS1 making an existing call is controlled to direct its null direction toward new-call terminal PS2. This is because a depth of the null (i.e., an amount by which a radio wave intensity is suppressed in the null direction) is not practically infinite.

FIG. 15 illustrates a sequence flow of control processing for directing the null direction of the radio wave area toward the new-call position as described above. FIGS. 16A-16C conceptually show the directivity of the radio wave areas provided by a base station CS toward existing-call PS1 in accordance with the above processing sequence.

Referring to FIGS. 15 and 16A-16C, it is first assumed that existing-call terminal PS1 and base station CS are in communication with each other as shown in FIG. 16A.

Then, as shown in FIG. 16B, new-call terminal PS2 issues a request for link channel establishment to base station CS while existing-call terminal PS1 and base station CS are in communication with each other.

Referring to FIG. 15 again, when new-call terminal PS2 applies a request for link channel establishment to base station CS, base station CS sends a link channel allocation instruction to new-call terminal PS2.

New-call terminal PS2 performs carrier sense for measuring an interference wave, and determines whether the channel, of which allocation is instructed by base station CS, is a connectable channel or not.

Base station CS keeps the communication with existing-call terminal PS1 and, at the same time, controls the null direction of the radio wave area to be directed toward new-call terminal PS2, as shown in FIG. 16C.

Referring to FIG. 15 again, it may be determined from a result of the carrier sense in new-call terminal PS2 that an interference wave has only a predetermined power or lower in the allocated channel. In this case, new-call terminal PS2 sends a synchronous burst signal to base station CS.

In response to this, base station likewise sends a synchronous burst signal to new-call terminal PS2, and thereafter, synchronization between base station CS and new-call terminal PS2 is established.

However, according to the control of the sending directivity of base station CS described above as well as the carrier sense operation in the new-call terminal, the depth of null is not infinite as described above when the position of the new-call terminal is close to base station CS, even if the directivity of the radio wave area with respect to existing-call terminal PS1 is controlled to direct the null toward terminal PS2.

Therefore, such a case occurs that the radio wave level of the interference wave in new-call terminal PS2 does not lower to or below a specified value due to a radio wave emitted from base station CS. In this case, the channel is not allocated to the new-call terminal, which can originally communicate with the base station, so that the channel utilization efficiency cannot be improved.

DISCLOSURE OF THE INVENTION

An object of the invention is to provide an antenna directivity control method, in which a directivity of a radio wave sent from an SDMA base station can be controlled to improve a channel utilizing efficiency of the SDMA base station, as well as an apparatus for the same.

For achieving the above object, a radio apparatus according to claim 1 includes an array antenna provided with a plurality of antennas, and an adaptive array send control portion for controlling a send signal applied to each of the antennas and performing spacial multiplex communication with a plurality of terminals. The adaptive array send control portion lowers an intensity of a radio wave emitted to a first terminal for a predetermined period when a second terminal requests a connection while communication with the first terminal is being performed.

According to claim 2, the radio apparatus according to the claim 1 is further configured such that the adaptive array send control portion lowers the intensity of the radio wave emitted to the first terminal by a predetermined level for a predetermined period in response to detection of the fact that a receiving level of a radio wave emitted from the second terminal is larger than a predetermined level when the second terminal requests the connection.

According to claim 3, the radio apparatus according to the claim 1 is further configured such that the adaptive array send control portion lowers the intensity of the radio wave emitted to the first terminal by a level corresponding to a receiving level of a radio wave emitted from the second terminal for a predetermined period in response to detection of the fact that the receiving level of radio wave emitted from the second terminal is larger than a predetermined level when the second terminal requests the connection.

According to claim 4, the radio apparatus according to the claim 1 is further configured such that the adaptive array send control portion lowers the intensity of the radio wave emitted to the first terminal by a level corresponding to a receiving level of a radio wave emitted from the first terminal for a predetermined period when the second terminal requests the connection.

According to claim 5, the radio apparatus according to the claim 1 is further configured such that the adaptive array send control portion lowers the intensity of the radio wave emitted to the first terminal by a level corresponding to a receiving level of a radio wave emitted from the first terminal for a predetermined period in response to detection of the fact that a receiving level of a radio wave emitted from the second terminal is larger than a predetermined level when the second terminal requests the connection.

According to claim 6, the radio apparatus according to the claim 1 is further configured such that the adaptive array send control portion lowers the intensity of the radio wave emitted to the first terminal by a level corresponding to receiving levels of radio waves emitted from the first and second terminals for a predetermined period in response to detection of the fact that the receiving level of radio wave emitted from the second terminal is larger than a predetermined level when the second terminal requests the connection.

According to claim 7, the radio apparatus according to any one of the preceding claims 1 to 6 is further configured such that the adaptive array send control portion operates to direct a null direction of a radio wave sent to the first terminal toward the second terminal when the second terminal requests the connection.

According to claim 8, an antenna directivity control method includes the steps of controlling a send signal to be applied to each of a plurality of antennas of an array antenna, and establishing a send/receive channel in spacial multiplex communication with respect to a first terminal; lowering an intensity of a radio wave emitted to the first terminal for a predetermined period during measuring of an interference wave by the second terminal when the second terminal requests a connection while send/receive with respect to the first terminal is being performed; and establishing the send/receive channel in spacial multiplex communication with respect to the second terminal by controlling a send signal to be applied to each of the antennas in accordance with a result of the measurement of the interference wave by the second terminal.

According to claim 9, the antenna directivity control method according to the claim 8 is further configured such that the step of lowering the intensity of the radio wave emitted to the first terminal for a predetermined period includes the step of lowering the intensity of the radio wave emitted to the first terminal by a predetermined level in response to detection of the fact that a receiving level of a radio wave emitted from the second terminal is larger than a predetermined level when the second terminal requests the connection.

According to claim 10, the antenna directivity control method according to the claim 8 is further configured such that the step of lowering the intensity of the radio wave emitted to the first terminal for a predetermined period includes the step of lowering the intensity of the radio wave emitted to the first terminal by a level corresponding to a receiving level of a radio wave emitted from the second terminal in response to detection of the fact that the receiving level of radio wave emitted from the second terminal is larger than a predetermined level when the second terminal requests the connection.

According to claim 11, the antenna directivity control method according to the claim 8 is further configured such that the step of lowering the intensity of the radio wave emitted to the first terminal for a predetermined period includes the step of lowering the intensity of the radio wave emitted to the first terminal by a level corresponding to a receiving level of a radio wave emitted from the first terminal when the second terminal requests the connection.

According to claim 12, the antenna directivity control method according to the claim 8 is further configured such that the step of lowering the intensity of the radio wave emitted to the first terminal for a predetermined period includes the step of lowering the intensity of the radio wave emitted to the first terminal by a level corresponding to a receiving level of a radio wave emitted from the first terminal in response to detection of the fact that a receiving level of a radio wave emitted from the second terminal is larger than a predetermined level when the second terminal requests the connection.

According to claim 13, the antenna directivity control method according to the claim 8 is further configured such that the step of lowering the intensity of the radio wave emitted to the first terminal for a predetermined period includes the step of lowering the intensity of the radio wave emitted to the first terminal by a level corresponding to receiving levels of radio waves emitted from the first and second terminals in response to detection of the fact that the receiving level of radio wave emitted from the second terminal is larger than a predetermined level when the second terminal requests the connection.

According to claim 14, the antenna directivity control method according to any one of the preceding claims 8-13 is further configured such that the step of lowering the intensity of the radio wave emitted to the first terminal for a predetermined period includes the step of directing a null direction of the radio wave emitted to the first terminal toward the second terminal when the second terminal requests the connection.

According to the invention, therefore, it is possible to lower a level of an interference wave in the terminal requesting the connection so that the connection can be easily established between the terminal and the apparatus provided with the antenna.

Further, according to the invention, it is possible to direct the antenna directivity toward a terminal other than the terminal, which is already connected, while keeping a communication quality of the already-connecetd terminal at a predetermined level or higher. Therefore, the former terminal in a different direction can be easily connected to the apparatus provided with the antenna without impeding the communication with the already-connected terminal.

BEST MODE FOR CARRYING OUT THE INVENTION

Embodiments of the invention will now be described with reference to the drawings.

First Embodiment

Figure 1:
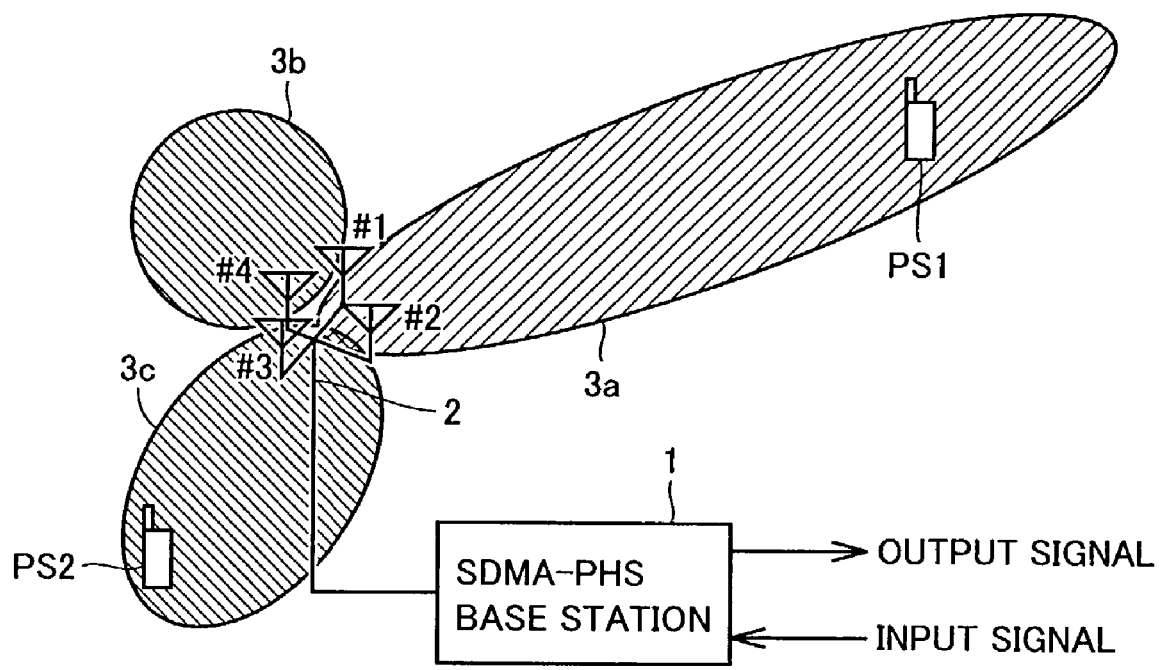
FIG. 1 schematically shows a structure for performing communication between a PHS terminal PS2 and a PHS base station.

FIG. 1 is a schematic view showing a structure for performing communication between a PHS terminal PS2 and a PHS base station.

Referring to FIG. 1, an SDMA-PHS base station 1, which will be referred to as an "SDMA base station" hereinafter, forms a directive radio wave area 3a in a direction (main direction) toward a PHS terminal PS1. In this station, a PHS terminal PS2 enters an unnecessary radiation area 3b or 3c (i.e., directive radio wave area in a secondary direction), which occurs simultaneously with directive radio wave area 3a, for starting PHS communication.

Figure 2:
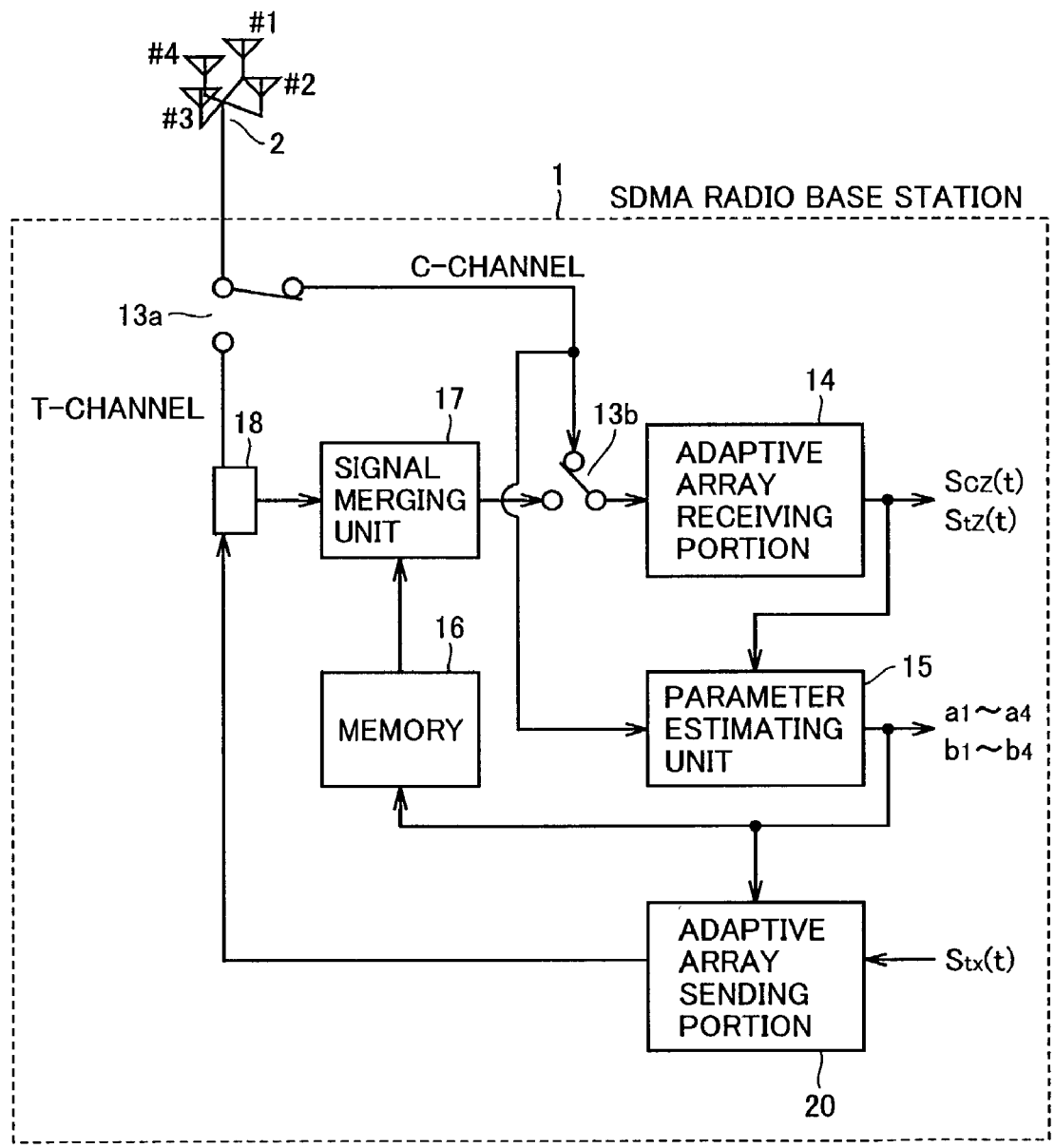
FIG. 2 is a schematic block diagram showing a structure of an SDMA base station 1.

FIG. 2 is a schematic block diagram showing a structure of SDMA base station 1.

Referring to FIG. 2, SDMA base station 1 includes an array antenna 2 formed of antennas #1, #2, #3 and #4 of n (four in this embodiment) in number, a switch SW13a for switching a transmission path depending on whether an input signal supplied from array antenna 2 is a C-channel signal or a T-channel signal, a switch 18 for receiving a signal from switch SW13a when a T-channel signal is supplied from array antenna 2, and switching a signal path depending on a receive mode and a send mode, a signal merging unit 17 for merging the T-channel signal sent from switch 18 and training information in the receive mode, a switch SW13b, which receives and selects the signals sent from switch SW13a and signal merging unit 17 for transmitting the signal sent from switch SW13a when the C-channel signal is input from array antenna 2, and for transmitting the signal sent from signal merging unit 17 when the T-channel signal is input from array antenna 2, a memory 16 for storing the foregoing training information, an adaptive array receiving portion 14 for extracting a signal, which is sent from the terminal, from the information of C-channel supplied from switch 13b or the information supplied from signal merging unit 17, a parameter estimating unit 15 for obtaining a response vector from the information of C-channel and the information applied from adaptive array 14, and a memory 16 for temporarily storing information applied from parameter estimating unit 15.

SDMA base station 1 further includes an adaptive array sending portion 20, which receives a send signal Stx(t) in the sending mode, and produces signals to be applied to respective antennas #1-#4 of array antenna 2 in accordance with a wait vector sent from parameter estimating unit 15. As will be described later, adaptive array sending portion 20 controls intensity and directivity of a radio wave emitted from array antenna 2 in accordance with data sent from parameter estimating unit 15.

Although not shown, an analog-digital converter is arranged between array antenna 2 and switch SW13a.

When PHS terminal PS2 is operated to start a call after entering unnecessary radiation area 3c extending from directive radio wave area 3a provided by SDMA base station 1, PHS terminal PS2 sends a request signal for link channel establishment (i.e., connection request signal) to SDMA base station 1 via the C-channel.

For receiving the C-channel signal by SDMA base station 1, switches SW13a and 13b are set to send the signal sent from array antenna 2 to adaptive array receiving portion 14 so that the C-channel signal is supplied to adaptive array receiving portion 14 via array antenna 2.

Signal lines extending from array antenna 2 are provided for each antenna. For the antennas of n in number, n signal lines are provided for each of adaptive antenna receiving portion 14, parameter estimating unit 15 and signal merging unit 17. In this embodiment, since array antennas 2 are four in number, four signal lines are provided for each of them.

Assuming that the C-channel signal sent from PHS terminal PS2 is represented by Scz(t), a C-channel received signal Xc1(t) on first antenna #1 can be expressed by the following formula:

$Xc1(t)=a1 \times Sc2(t)+n1(t)$ where a1 is a factor changing for improvement in real time. A C-channel received signal on second antenna #2 is expressed as follows:

$Xc2(t)=a2 \times Sc2(t)+n2(t)$ where a2 is likewise a factor changing in real time.

Likewise, a C-channel received signal Xcn(t) on antenna #n in an nth position among the antennas of n in number is expressed as follows:

$Xcn(t)=an \times Scn(t)+nn(t)$ where an is a factor changing in real time.

Factors a1, a2, a3, a4, . . . and an described above represent that differences in intensity and phase occur between signals received by antennas #1, #2, #3, . . . and #n forming array antenna 2 because these antennas are located at different positions with respect to the radio signal sent from PHS terminal PS2, respectively. In this embodiment, each antenna is spaced by about one meter, i.e., a distance longer by five times than a wavelength of the radio signal.

Since each PHS terminal PS is moving, these factors change in real time.

The foregoing n1, n2, n 3, . . . and nn represent noises generated in the respective antennas and receiving circuits.

Signals Xc1, Xc2, Xc3 and Xc4 received by the respective antennas are supplied to adaptive array receiving portion 14, which obtains and outputs signal Scz(t), i.e., the C-channel signal sent from PHS terminal PS2.

Signals Xc1, Xc2, Xc3 and Xc4 received on the antennas are also supplied to parameter estimating unit 15, and correlative values C1, C2, C3 and C4 of received signals Xc1, Xc2, Xc3 and Xc4 with respect to the output signal of adaptive array receiving portion 14 are calculated, respectively, so that the array response vectors of the respective antennas can be obtained by the following formulas:

$$C_1 = \frac{\sum_{t=1}^{T} \{a_1 S_{CZ}(t) \times S_{CZ}(t) + n_1(t) \times S_{CZ}(t)\}}{T \times |X_{C1}| \times |S_{CZ}(t)|} = a_1$$

$$C_2 = \frac{\sum_{t=1}^{T} \{a_2 S_{CZ}(t) \times S_{CZ}(t) + n_2(t) \times S_{CZ}(t)\}}{T \times |X_{C2}| \times |S_{CZ}(t)|} = a_2$$

$$C_3 = \frac{\sum_{t=1}^{T} \{a_3 S_{CZ}(t) \times S_{CZ}(t) + n_3(t) \times S_{CZ}(t)\}}{T \times |X_{C3}| \times |S_{CZ}(t)|} = a_3$$

$$C_4 = \frac{\sum_{t=1}^{T} \{a_4 S_{CZ}(t) \times S_{CZ}(t) + n_4(t) \times S_{CZ}(t)\}}{T \times |X_{C4}| \times |S_{CZ}(t)|} = a_4$$

$$\vdots$$

$$C_n = \frac{\sum_{t=1}^{T} \{a_n S_{CZ}(t) \times S_{CZ}(t) + n_n(t) \times S_{CZ}(t)\}}{T \times |X_{Cn}| \times |S_{CZ}(t)|} = a_n$$

Thereby, parameter estimating unit 15 obtains and outputs array response vectors a1, a2, a3 and a4 of the respective antennas.

Array response vectors a1, a2, a3 and a4 output from parameter estimating unit 15 are supplied to memory 16 for temporary storage.

Then, SDMA base station 1 sends a link channel allocation signal, which designates the T-channel allowing connection, via the C-channel to PHS terminal PS2, which sent the request signal for link channel establishment via the C-channel.

In the above operation, it is assumed that SDMA base station 1 designates the same T-channel and the same frequency as those used by PHS terminal PS1.

Based on the link channel information sent from SDMA base station 1, PHS terminal PS2 measures a U-wave on the designated T-channel, and thus determines whether it has received an interference wave signal of a predetermined power or higher on the designated T-channel or not.

During this operation, the directive radio wave directed toward PHS terminal PS1 causes unnecessary radiation of a radio wave in a position of PHS terminal PS2. Therefore, a signal of a power of a predetermined value or higher is detected on the designated T-channel so that the synchronous burst signal cannot be sent.

In this state, PHS terminal PS1 is already connected to SDMA base station 1, and is using the T-channel for communication.

The SDMA base station 1 of the first embodiment lowers a sending power for existing-call terminal PS1 at least while new-call terminal PS2 is performing carrier sense, as will be described below.

For example, the sending power is lowered by a level of 20 dB, although no restricted thereto.

Since the synchronous channel is established with respect to existing-call terminal PS1 owing to the radio wave area, which is provided by the adaptive antenna and has the directivity, the good communication channel can be ensured even when the sending power is lowered by the above level. In contrast to the above, new-call terminal PS2 is in such as state that terminal PS2 receives, as an interference wave, an unnecessary radio wave radiated in a secondary direction other than the main direction of existing-call terminal PS1. Therefore, the lowering of the sending power by the above level causes such a state that the above unnecessarily radiated radio wave takes a value enough to lower the level of the interference wave in the position of the new-call terminal PS2.

Figure 3A:
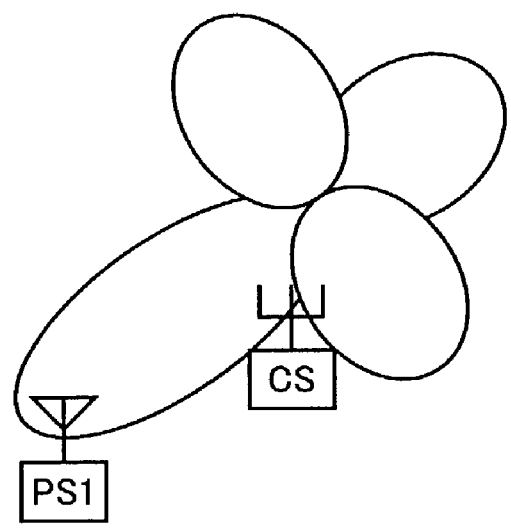
FIGS. 3A-3C illustrate a sequence flow of a channel allocating operation.
Figure 3B:
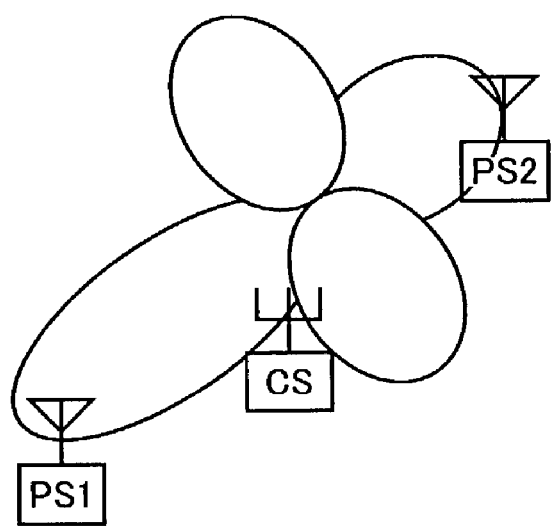
Figure 3C:
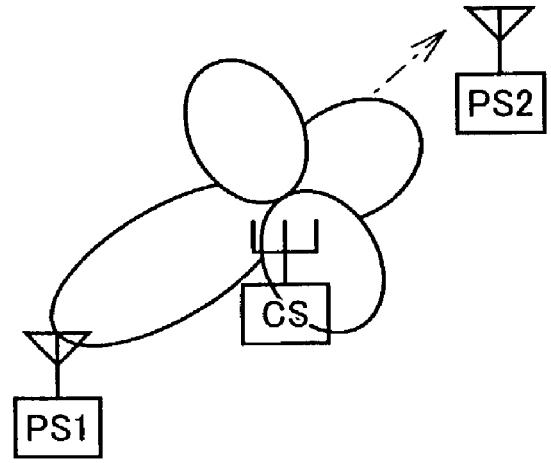
Figure 4:
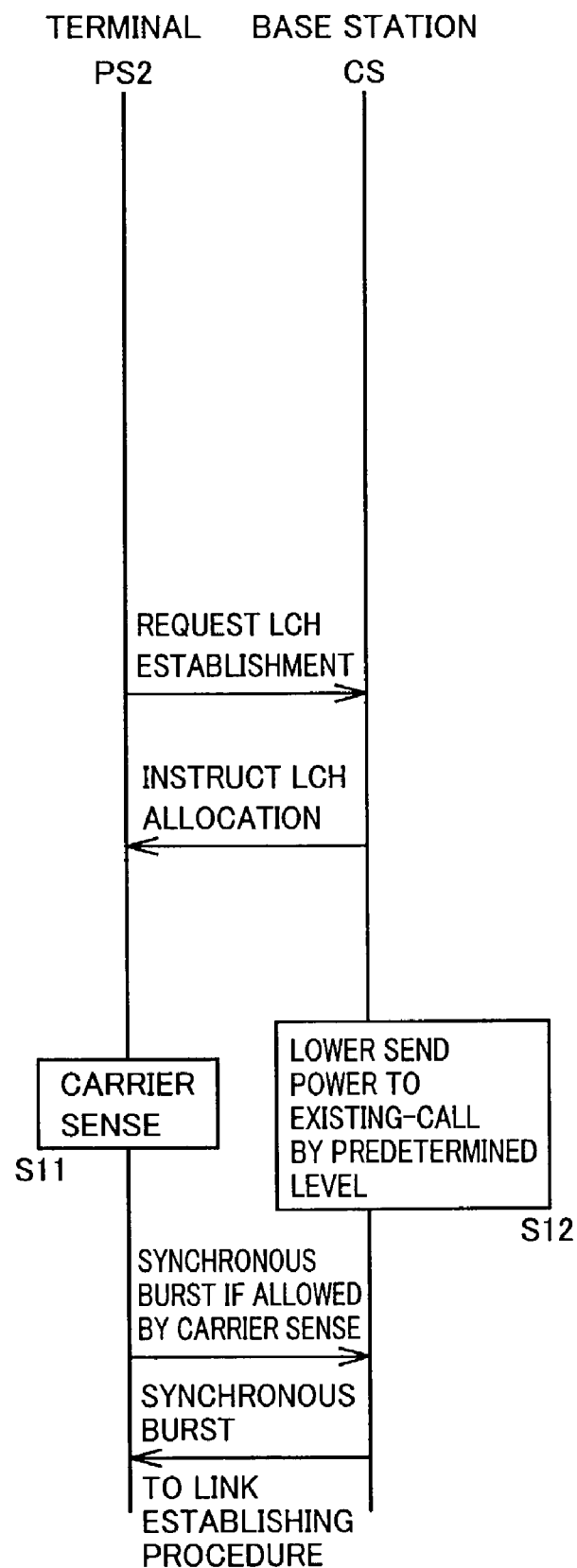
FIG. 4 conceptually illustrates spreading of a radio wave area from a base station CS in the case of channel allocation.

FIGS. 3A-3C illustrate a sequence flow of the channel allocation operation. FIG. 4 conceptually illustrates spreading of the radio wave area from base station CS during the channel allocation.

Referring to FIGS. 3A-3C and 4, it is first assumed that base station CS and existing-call terminal PS1 are already in communication with each other as shown in FIG. 3A.

In this state, new-call terminal PS2 issues a link channel establishment request via the C-channel to base station CS, as shown in FIG. 3B.

Referring to FIG. 4, base station CS instructs allocation of the T-channel for the instruction of link channel allocation in response to the link channel establishment request issued from new-call terminal PS2 to base station CS.

In response to the above, new-call terminal PS2 performs the carrier sense for measuring the interference wave level (step S11). In parallel with this, base station CS performs the processing for lowering the sending power for the existing-call by a predetermined level (step S12). This state is shown in FIG. 3C.

Since the unnecessary radiation level lowers in the position of new-call terminal PS2, the interference wave level lowers in the position of new-call terminal PS2.

According to the above processing, as shown in FIG. 4, new-call terminal PS2 sends the synchronous burst signal to base station CS if the interference wave level in new-call terminal PS2 is at or lower than the predetermined level. In response to the sending of the synchronous burst signal, base station CS returns the synchronous burst signal to new-call terminal PS2 so that the synchronized state is established between the base station and new-call terminal PS2.

Owing to the above operations, times of occurrence of such a situation are reduced that a result of the carrier sense by the new-call terminal does not satisfy the specifications after allocation of the channel to the new-call terminal by the base station.

Thereby, the average time required before start of conversation can be reduced. Further, it is possible to improve a call success probability of new call to the base station.

Second Embodiment

According to the sending directivity control of SDMA base station 1 of the first embodiment, when a multiplex channel is to be allocated to a new-call in response to the link channel connection request issued by the new-call, the sending power for the existing-call is lowered by a predetermined level for a period of the carrier sense performed by the new-call terminal, and thereby the interference wave level in the position of the new-call is lowered. According to a second embodiment, when SDMA base station 1 allocates a multiplex channel to a new-call, it likewise lowers the sending power for the existing-call by a predetermined level during a period of the carrier sense performed by the new-call. In addition to this, SDMA base station 1 controls the sending directivity for the existing-call so that the null direction of the sent radio wave area for the existing-call may be directed toward the new-call.

Figure 5A:
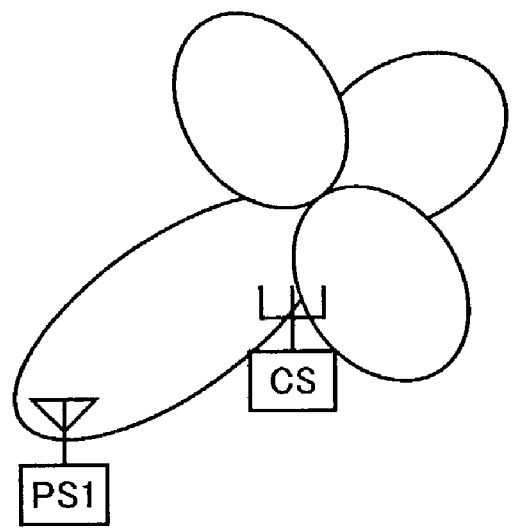
FIGS. 5A-5C conceptually show control for lowering a sending level for existing call and directing a null direction of sending directivity toward the existing call in multiplexer channel allocation.
Figure 5B:
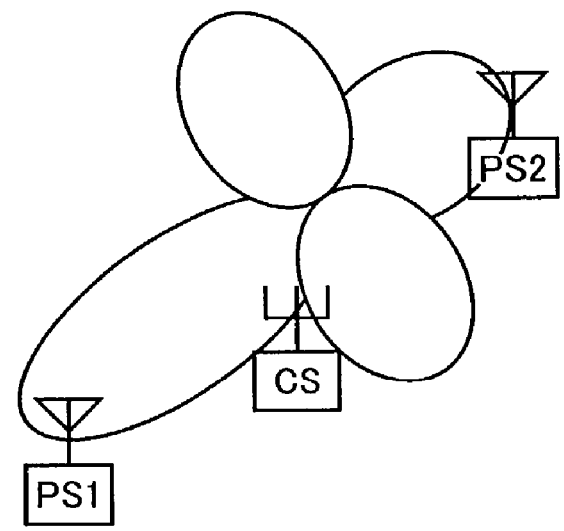
Figure 5C:
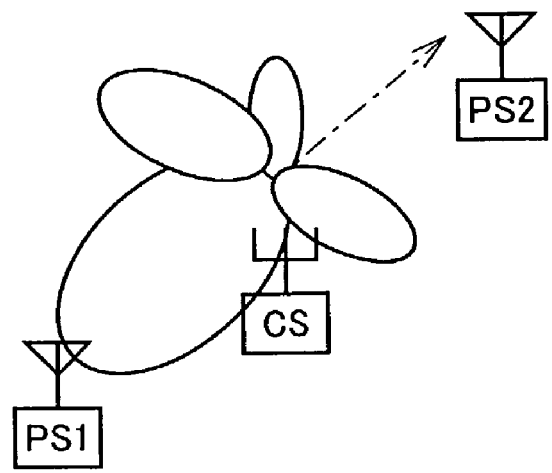
Figure 6:
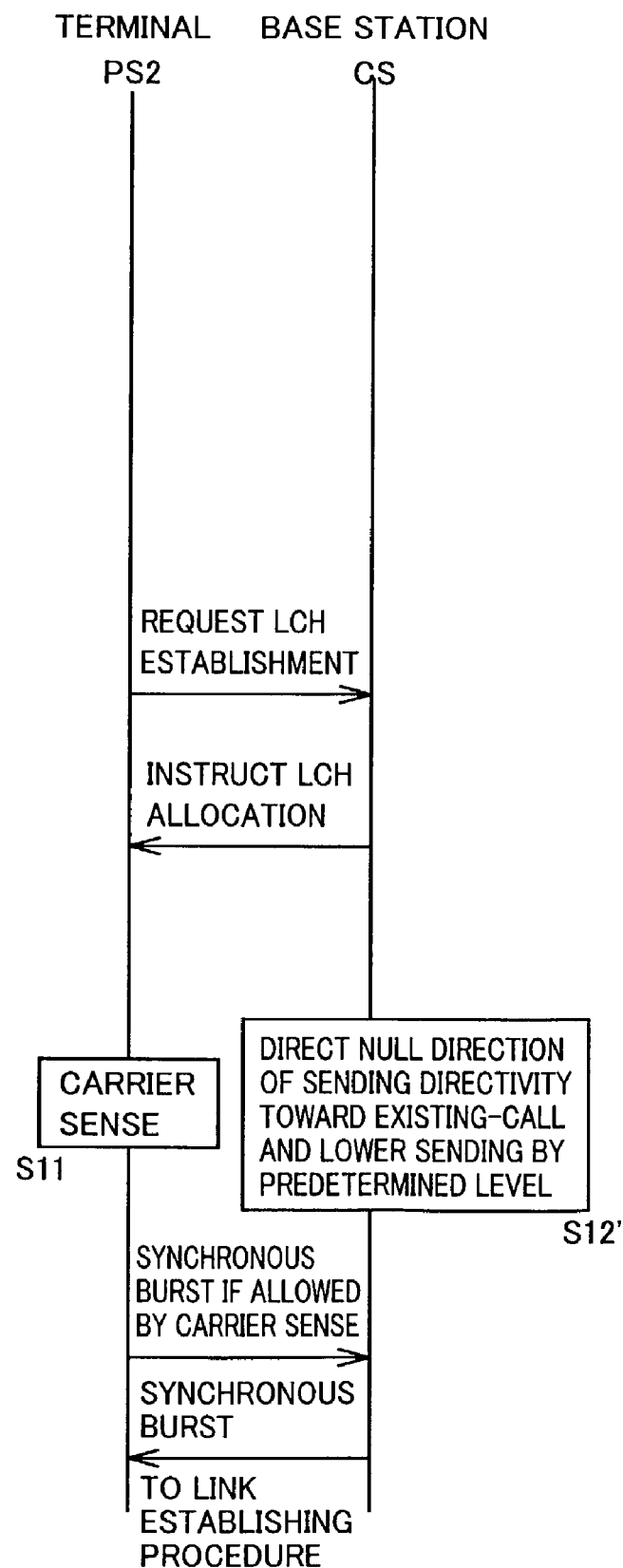
FIG. 6 illustrates a sequence flow of an operation of an SDMA base station 1 for performing channel allocation.

FIGS. 5A-5C conceptually show the control performed in the multiplex channel allocation operation for lowering the sending level for the existing-call and directing the null direction of sending directivity for the existing-call toward the existing-call. FIG. 6 illustrates a sequence flow of the operation of SDMA base station 1 for performing such channel allocation.

Referring to FIGS. 5A-5C and FIG. 6, it is first assumed that base station CS and existing-call terminal PS1 are already in communication with each other.

In this state, it is assumed that new-call terminal PS2 issues a link channel establishment request to base station CS as shown in FIG. 5B.

Referring to FIG. 6, base station CS instructs allocation of the T-channel for the instruction of link channel allocation in response to the link channel establishment request issued from new-call terminal PS2 to base station CS.

In response to the above, new-call terminal PS2 performs the carrier sense for measuring the interference wave level (step S11). In parallel with this, base station CS performs the processing for directing the null direction of the sending directivity toward the existing-call and lowering the sending power for the existing-call by a predetermined level (step S12'). This state is shown in FIG. 5C.

Since the unnecessary radiation level lowers in the position of new-call terminal PS2, the interference wave level lowers in the position of new-call terminal PS2.

According to the above processing, as shown in FIG. 6, new-call terminal PS2 sends the synchronous burst signal to base station CS if the interference wave level in new-call terminal PS2 is at or lower than the predetermined level. In response to the sending of the synchronous burst signal, base station CS returns the synchronous burst signal to new-call terminal PS2 so that the synchronized state is established between base station CS and terminal PS2.

[Null Direction Control by SDMA Base Station]

As already described in connection with the first embodiment, when new-call terminal PS2 sends the link channel establishment request via the C-channel, base station CS obtains array response vectors a1, a2, a3 and a4 with respect to the C-channel signal sent from new-call terminal PS2. Description will now be given in greater detail on the above operation as well as the operation of controlling for directing the null direction of the sending directivity for the existing-call toward new-call terminal PS2.

For receiving the C-channel signal by SDMA base station 1, switch SW13a selects signal merging unit 17 so that the T-channel signal is supplied to signal merging unit 17 via array antenna 2.

Assuming that PHS terminal PS1 sends a T-channel signal STA(t), a T-channel received signal Xt1 (t) on first array antenna #1 is expressed by the following formula:

$$Xt1(t)=b1 \times StA(t)+n1(t)$$

where b 1 is a factor changing for improvement in real time.

Likewise, if there are n antennas, T-channel received signal Xtn(t) on nth antenna #n can be expressed by the following formula:

$$Xtn(t)=bn \times StA(t)+nn(t)$$

where bn is also a factor changing in real time.

Factors b1, b2, b3, b4, . . . and bn described above represent that differences in intensity and phase occur between signals received by antennas #1, #2, #3, . . . and #n forming array antenna 2 because these antennas are located at different positions with respect to the radio signal sent from PHS terminal PS1, respectively. Since each PHS terminal is moving, these factors change in real time. The foregoing n1, n2, n3, . . . and nn represent noises generated in the respective antennas and receiving circuits.

Signals Xt1, Xt2, Xt3 and Xt4 received by the respective antennas are supplied to signal merging unit 17. Signal merging unit 17 produces T-channel information, which is sent from PHS terminal PS2 falsely determined by the respective antennas, from array response vectors a1, a2, a3 and a4 of PHS terminal PS2 on the respective antennas, which are temporarily stored in memory 16, and a false T-channel signal ST2(t) of PHS terminal PS2, which is already produced and stored in memory 16.

Signal merging unit 17 merges T-channel received signal Xt1, Xt2, Xt3 and Xt4 of PHS terminal PS1 received by antenna 2 with the foregoing T-channel information sent from the false PHS terminal PS2. Adaptive array receiving portion 14 is supplied with merged signals Xt1', Xt2', Xt3' and Xt4' thus produced by signal merging unit 17 from signals of PHS terminals PS1 and PS2 on the respective antennas. Memory 16 has internally prepared and stored in advance a T-channel signal ST2(t) of PHS terminal PS2, which is estimated as the signal to be sent thereto.

Merged signal Xt1'(t) on the first antenna #1 is expressed by the following formula:

$$Xt1'(t)=b1T \times StA(t)+a1 \times STZ(t)+n1(t)$$

Likewise, if there are n antennas, merged signal Xtn'(t) on the nth antenna #n is expressed by the following formula:

$$Xtn'(t)=bnT \times StA(t)+an \times STZ(t)+nn(t)$$

Accordingly, merged signals Xt1'(t), Xt2'(t), . . . and Xt4'(t) supplied to adaptive array receiving portion 14 are merged signals formed of (b1×StA(t), . . . , b4×StA(t)) supplied from PHS terminal PS1, signals (a1×StZ(t), . . . , a4×StZ(t)) supplied from PHS terminal PS2, and noises, respectively.

The above merged signal includes the signal sent from PHS terminal PS1, which is currently in communication via the T-channel designated by the PHS base station, and practically includes an additional signal, which is provided by a radio wave sent from PHS terminal PS2 not actually sending a radio wave on the T-channel.

If the adaptive array antenna operates, e.g., in accordance with RLS (Recursive Least Square) algorithm, the directivity in the main direction is directed toward the desired signal, and a null point is formed for the interference signal.

Accordingly, when adaptive array receiving signal 14 uses the merged signal of signals of PHS terminals PS1 and PS2 for controlling the directivity, control can be performed as shown in FIGS. 5A-5C. More specifically, the directivity toward PHS terminal PS1 (in the main direction) is adjusted to maintain the directive radio wave area so that the communication quality for PHS terminal PS1 is kept at a predetermined level or higher, and the sending power for PHS terminal PS1 is reduced by a predetermined value. Further, the null point of the antenna directivity is directed toward PHS terminal PS2 while giving consideration also to unnecessary radiation (directive radio wave area in a secondary direction). Therefore, the interference wave level can be reduced in PHS terminal PS2.

Thereby, the radio wave sent from SDMA base station 1 is kept at or below a predetermined level in the position of PHS terminal PS2 performing the U-wave measurement so that the U-wave measurement in PHS terminal PS2 can be normally completed, and it is possible to perform the processing in and after the step of sending of the synchronous burst signal using the T-channel.

SDMA base station 1 receives the signal including the synchronous burst signal sent from PHS terminal PS2 via the T-channel, and controls the directivity to extract this synchronous burst signal so that a directive area 4a can be formed in the direction toward PHS terminal PS2, and PHS terminal PS2 can communicate with SDMA base station 1 via the T-channel.

Third Embodiment

In the first embodiment, when the SDMA base station allocates a multiplex channel to a new-call, the sending power for the existing-call is lowered by a predetermined level while the new-call terminal is performing the carrier sense.

According to a third embodiment, however, when SDMA base station 1 allocates the multiplex channel to the existing-call, step S12 of the first embodiment illustrated in FIG. 4 is not employed. Alternatively, the receiving level of radio wave emitted from the new-call is measured, and the sending power for the existing-call is lower by a predetermined level during the carrier sense by the new-call, if the receiving level thus measured is higher than a predetermined level.

Figure 7:
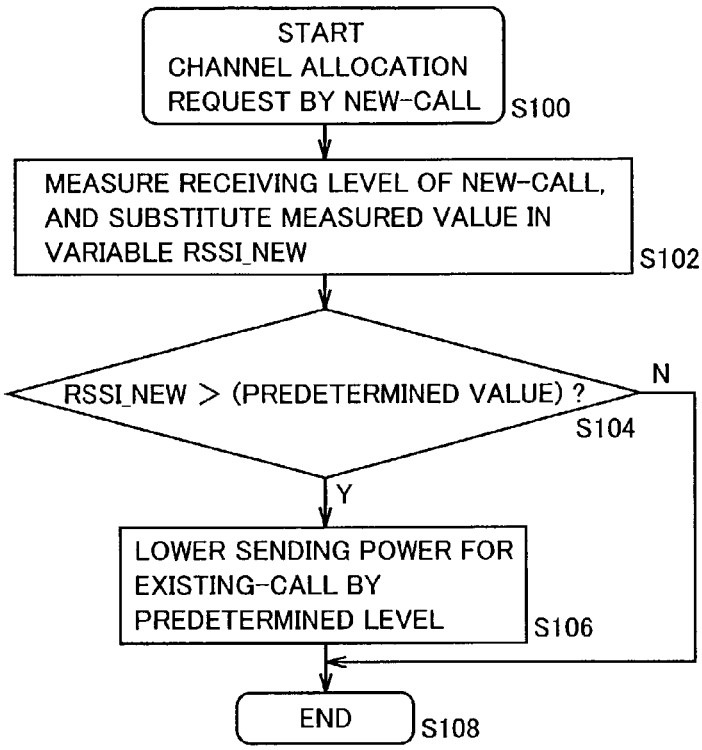
FIG. 7 is a flowchart illustrating processing of SDMA base station 1 in a third embodiment.

FIG. 7 is a flowchart illustrating a flow of such processing in SDMA base station 1 of the third embodiment.

When the new-call requests the channel allocation (step S100), the SDMA base station measures the receiving level of radio wave emitted from the new-call, and substitutes the measured value in a variable RSSI_NEW (step S102).

Subsequently, SDMA base station 1 compares the value of variable RSSI_NEW with a predetermined value (step S104), and lowers the sending power for the existing-call by a predetermined level (step S106) if the receiving level of radio wave emitted from the new-call is larger than a predetermined value.

From the comparison of the value of variable RSSI_NEW with the predetermined value performed by SDMA base station 1 in step S104, it may be determined that the receiving level of radio wave emitted from the new-call is not higher than the predetermined level. In this case, the processing ends without changing the sending power for the existing-call (step S108).

In the third embodiment, therefore, the processing of lowering the sending power for the existing-call is performed only when the new-call is located relatively near SDMA base station 1.

The predetermined level, by which the sending power is lowered, can be equal, e.g., to 20 dB, similarly to the first embodiment.

If the new-call is sufficiently far from SDMA base station 1, and it can be considered that an interference wave is at a sufficiently low level not requiring lowering of the sending power for the existing-call, it is possible by the above processing to eliminate the processing of lowering the sending power level for the existing-call so that an average time required before starting conversation can be further reduced.

[Modification of Third Embodiment]

In the third embodiment, when SDMA base station 1 allocates a multiplex channel to a new-call, the receiving level of radio wave emitted from the new-call is measured, and the sending power for the existing-call is lowered by a predetermined level during the carrier sense by the new-call terminal, if the measured level is higher than a predetermined level.

However, processing in step S12' of the second embodiment shown in FIG. 6 may be eliminated, and alternatively, the receiving level of radio wave emitted from the new-call may be measured, and control can be performed as follows. If the receiving level thus measured is higher than the predetermined level, the sending power for the existing-call is lowered by a predetermined level, and further the sending directivity for the existing-call is adjusted to direct the null direction of the sent radio wave area for the existing-call toward the new-call.

Fourth Embodiment

In SDMA base station 1 of a fourth embodiment, the processing in step S12 of the first embodiment shown in FIG. 4 is not performed, and alternatively, a multiplex channel is allocated to a new-call for the spacial multiplex communication in such a manner that the receiving level of radio wave emitted from the new-call is measured during the carrier sense by the new-call terminal, and the sending power for the existing-call is lowered in accordance with the receiving level of radio wave emitted from the new-call if the measured receiving level of radio wave emitted from the new-call is higher than a predetermined level.

Figure 8:
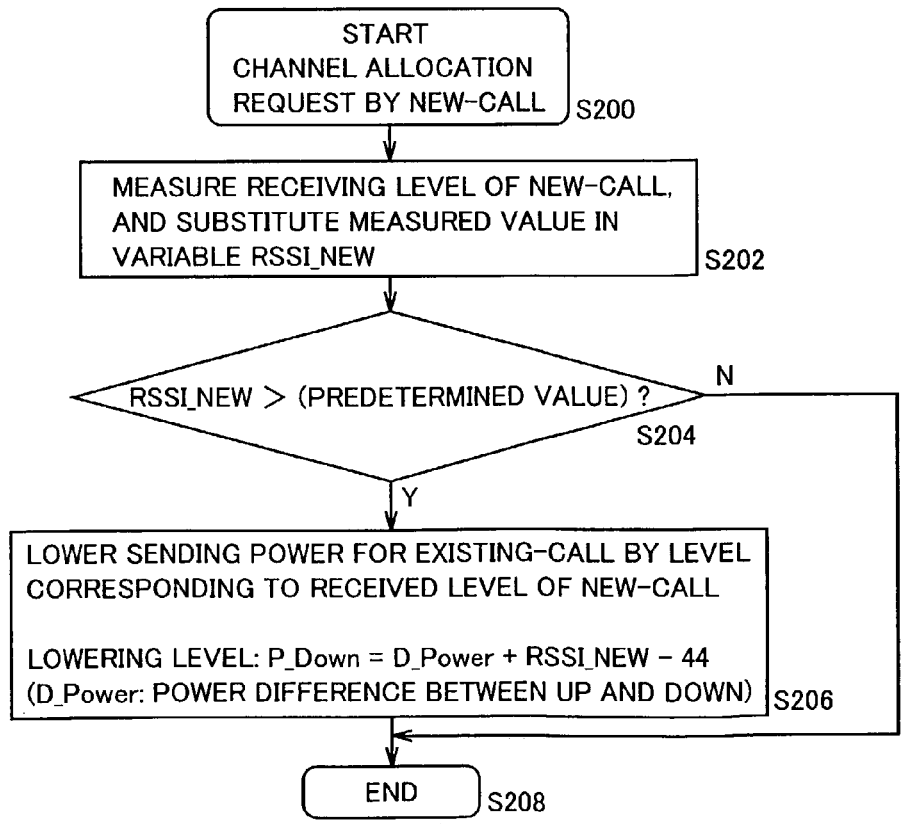
FIG. 8 is a flowchart illustrating processing of controlling a sending power in a fourth embodiment.

FIG. 8 is a flowchart illustrating such sending power control processing of the fourth embodiment.

Referring to FIG. 8, when the new-call requests the channel allocation (step S200), SDMA base station 1 measures the receiving level of radio wave emitted from the new-call, and substitutes the measured value in variable RSSI_NEW (step S202).

Subsequently, SDMA base station 1 compares the value of variable RSSI_NEW with a predetermined value (step S204), and performs a new processing step S206 for changing the sending power for the existing-call if the receiving level of radio wave emitted from the new-call is larger than the predetermined value.

Assuming that a power difference of D_Power (dB) is present between up and down of the system, SDMA base station 1 calculates a level P_Down (dB), by which the level is to be lowered, in accordance with the following formula (step S206):

$$P\_Down = D\_Power + RSSI\_NEW - 44 \quad (1)$$

Level P_Down for lowering can be calculated by the following formula:

$$P\_Down = D\_Power + RSSI\_NEW - 44 + Margin \quad (1')$$

SDMA base station 1 ends the processing without changing the sending power for the existing-call (step S208) if the receiving level of radio wave emitted from the new-call is not higher than the predetermined level as a result of the comparison of the value of variable RSSI_NEW with the predetermined value performed in step S204.

Power difference D_Power between up and down of the system is specified depending on the system and is equal, e.g., to 17 dB.

The predetermined level is specified depending on the system and is equal to, e.g., 44 dBµV. A value of margin Margin is appropriately determined depending on the system and is equal, e.g., to 10 dB.

Similarly to the second embodiment, it is possible in the fourth embodiment to add the processing of controlling the sending directivity of the existing-call to direct the null point toward the new-call.

Fifth Embodiment

In a fifth embodiment, when the multiplex channel is to be allocated to a new-call, SDMA base station 1 measures the receiving level of radio wave emitted from the existing-call while the new-call is performing the carrier sense, and lowers the sending power for the existing-call in accordance with the receiving level of radio wave emitted from the existing-call.

Figure 9:
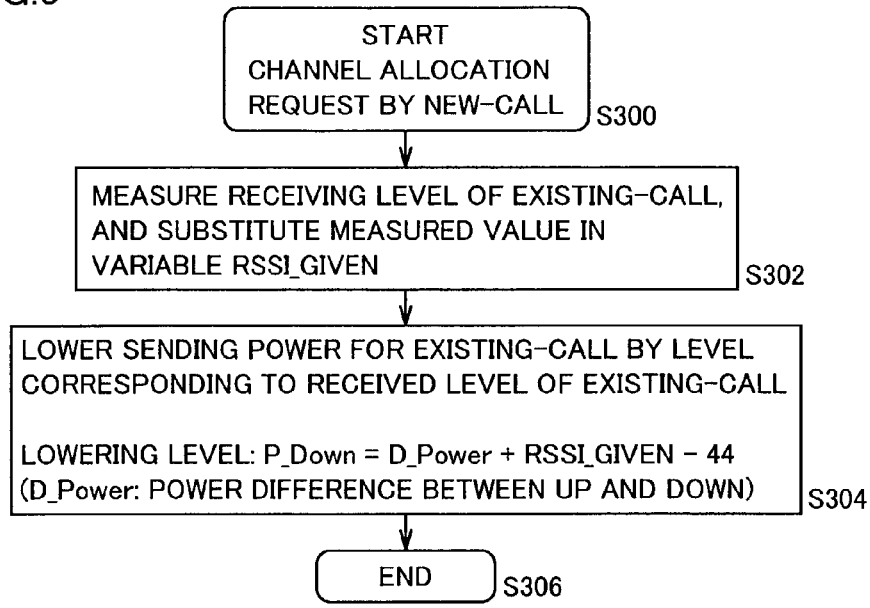
FIG. 9 is a flowchart illustrating processing of controlling a sending power in a fifth embodiment.

FIG. 9 is a flowchart illustrating such sending power control processing of the fifth embodiment.

Referring to FIG. 9, when the new-call requests the channel allocation (step S300), SDMA base station 1 measures the receiving level of radio wave emitted from existing-call, and substitutes the measured value in variable RSSI_GIVEN (step S302). However, the receiving level of radio wave emitted from the existing-call can be read from the memory because the receiving level of radio wave emitted from the existing-call is usually monitored and stored in the memory during the communication between the existing-call and the base station 1.

Assuming that the power difference of D_Power (dB) is present between up and down of the system, SDMA base station 1 calculates level P_Down (dB), by which the level is to be lowered, in accordance with the following formula (step S304):

$$P\_Down = D\_Power + RSSI\_GIVEN - 44 \quad (2)$$

Level P_Down for lowering can be calculated by the following formula:

$$P\_Down = D\_Power + RSSI\_GIVEN - 44 + Margin \quad (2')$$

Power difference D_Power between up and down of the system is specified depending on the system and is equal, e.g., to 17 dB.

The value of margin Margin is appropriately determined depending on the system and is equal, e.g., to 10 dB.

Similarly to the second embodiment, it is possible in the fifth embodiment to add the processing of controlling the sending directivity of the existing-call to direct the null point toward the new-call.

Sixth Embodiment

In a sixth embodiment, when the multiplex channel is to be allocated to a new-call, SDMA base station 1 measures the receiving levels of radio waves emitted from the new-call and existing-call while the new-call is performing the carrier sense, and lowers the sending power for the existing-call in accordance with the receiving level of radio wave emitted from the existing-call if the receiving level of radio wave emitted from the new-call is higher than a predetermined level.

Figure 10:
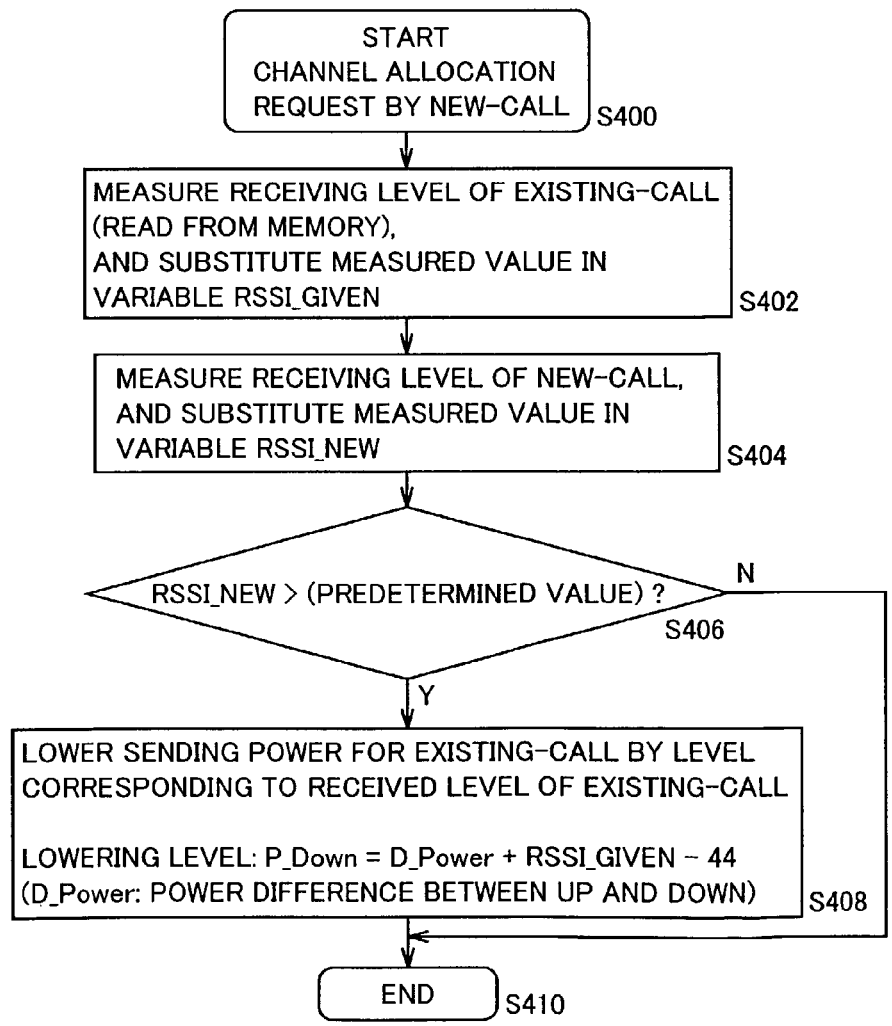
FIG. 10 is a flowchart illustrating processing of controlling a sending power in a sixth embodiment.

FIG. 10 is a flowchart illustrating such sending power control processing of the sixth embodiment.

Referring to FIG. 10, when the new-call requests the channel allocation (step S400), SDMA base station 1 reads out the receiving level of radio wave, which is emitted from the existing-call, from the memory, and substitutes the read value in variable RSSI_GIVEN (step S402).

Subsequently, SDMA base station 1 measures the receiving level of radio wave emitted from the new-call, and substitutes the measured value in variable RSSI_NEW (step S404).

Then, SDMA base station 1 compares the value of variable RSSI_NEW with a predetermined value (step S406), and performs a new processing step S408 for changing the sending power for the existing-call if the receiving level of radio wave emitted from the new-call is larger than the predetermined value.

Assuming that the power difference of D_Power (dB) is present between up and down of the system, SDMA base station 1 calculates level P_Down (dB), by which the level is to be lowered, in accordance with the following formula (step S408):

$$P\_Down = D\_Power + RSSI\_GIVEN - 44 \quad (3)$$

Level P_Down for lowering can be calculated by the following formula:

$$P\_Down = D\_Power + RSSI\_GIVEN - 44 + Margin \quad (3')$$

SDMA base station 1 ends the processing without changing the sending power for the existing-call (step S410) if the receiving level of radio wave emitted from the new-call is not higher than the predetermined level as a result of the comparison of the value of variable RSSI_NEW with the predetermined value performed in step S406.

Power difference D_Power between up and down of the system is specified depending on the system and is equal, e.g., to 17 dB.

The predetermined level is specified depending on the system and is equal to, e.g., 44 dBµV. The value of margin Margin is appropriately determined depending on the system and is equal, e.g., to 10 dB.

Similarly to the second embodiment, it is possible in the sixth embodiment to add the processing of controlling the sending directivity of the existing-call to direct the null point toward the new-call.

Seventh Embodiment

In a seventh embodiment, when the multiplex channel is to be allocated to a new-call, SDMA base station 1 measures the receiving levels of radio waves emitted from the new-call and existing-call while the new-call is performing the carrier sense, and lowers the sending power for the existing-call in accordance with the receiving levels of radio waves emitted from the new-call and existing-call if the receiving levels of radio wave emitted from the new-call and existing-call are higher than predetermined levels, respectively.

Figure 11:
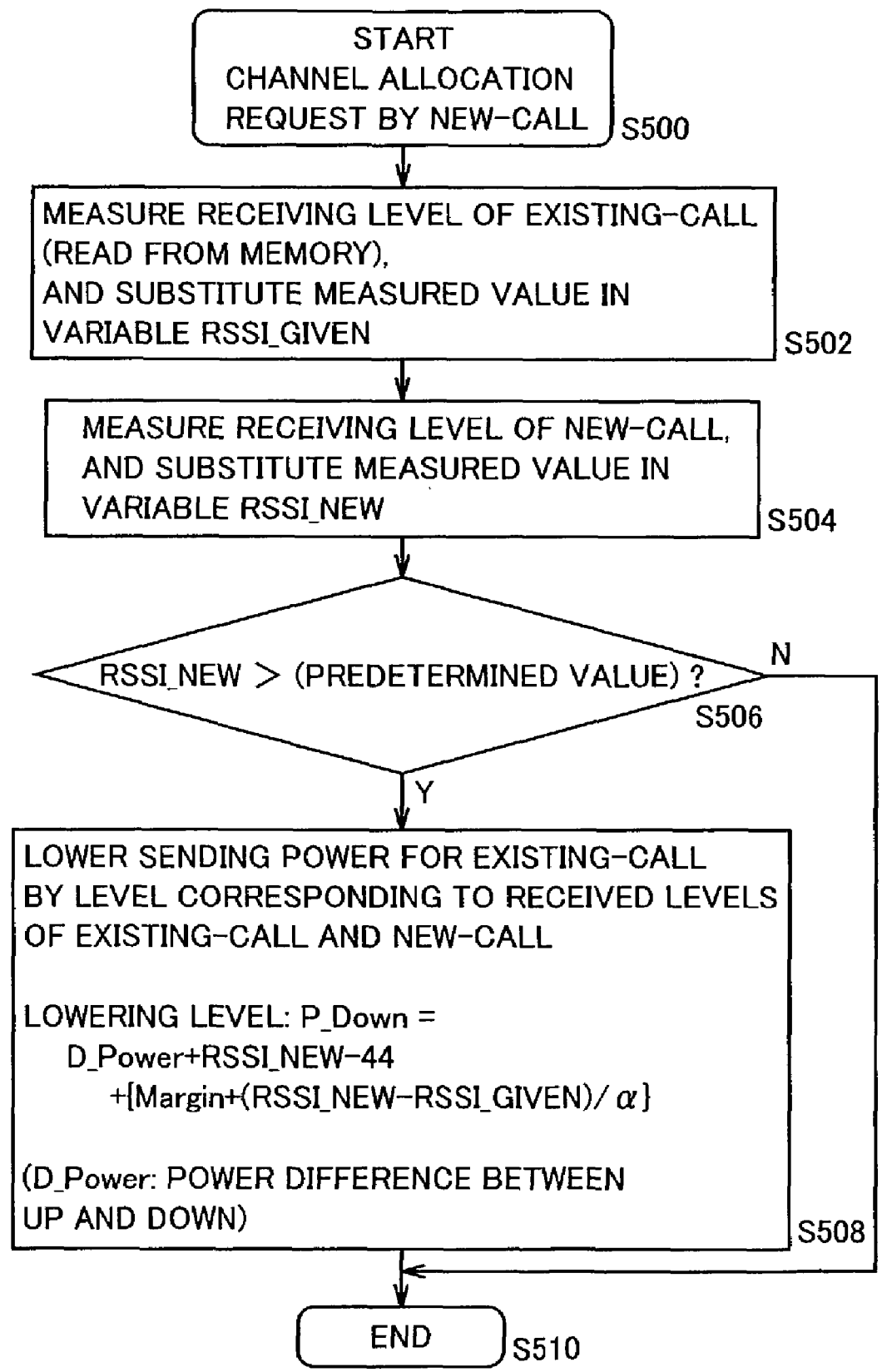
FIG. 11 is a flowchart illustrating processing of controlling a sending power in a seventh embodiment.
Figure 12:
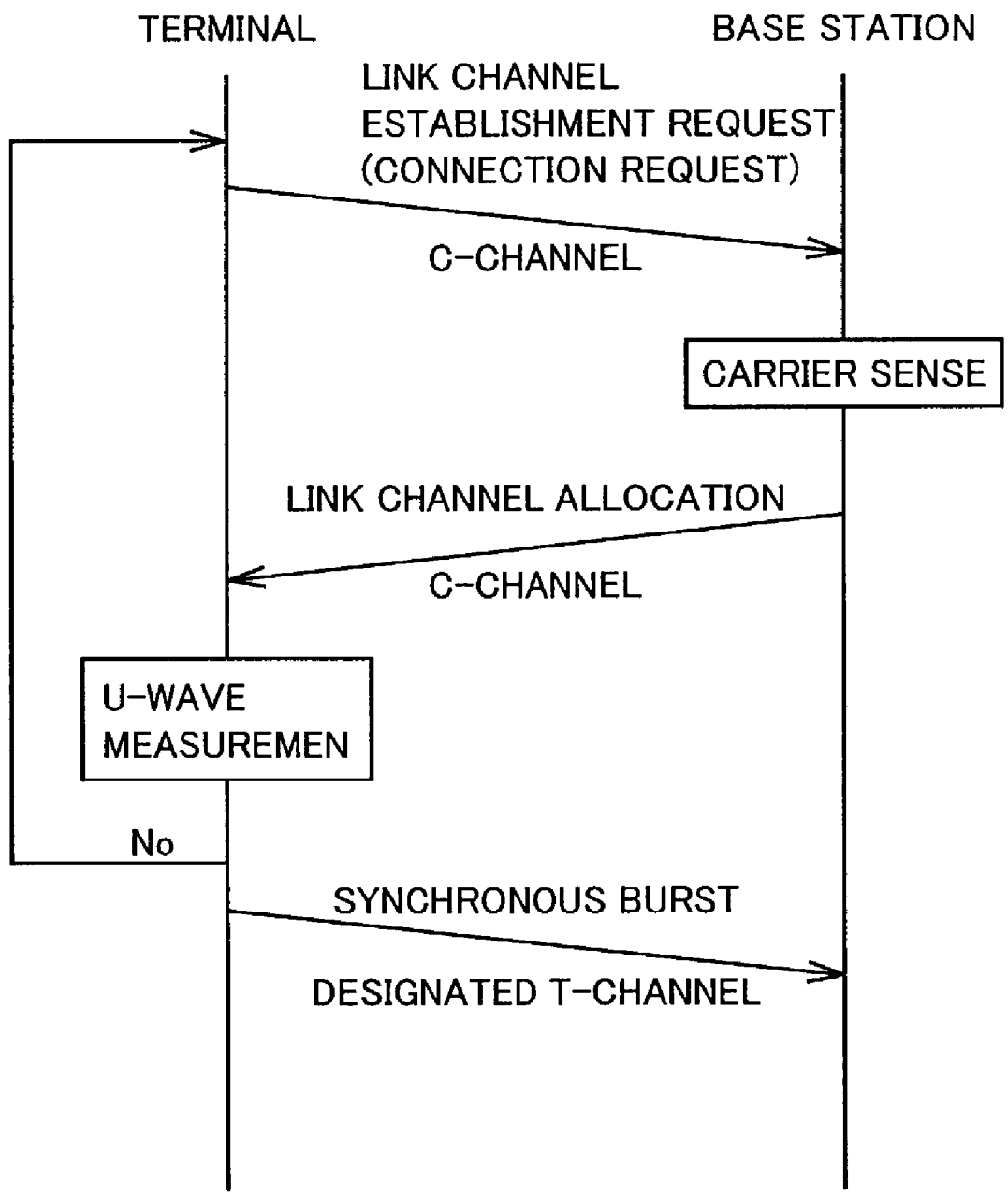
FIG. 12 illustrates a sequence flow of processing of measuring a U-wave.
Figure 13:
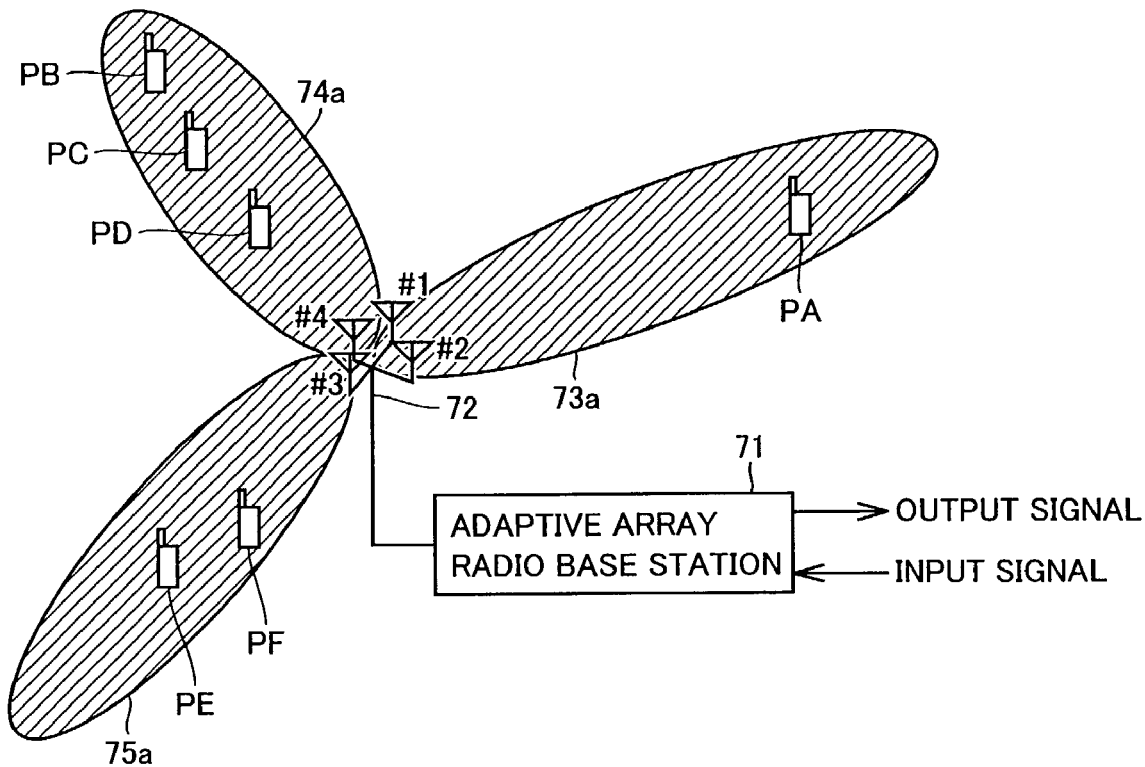
FIG. 13 conceptually shows a terminal communicating with an SDM base station.
Figure 14:
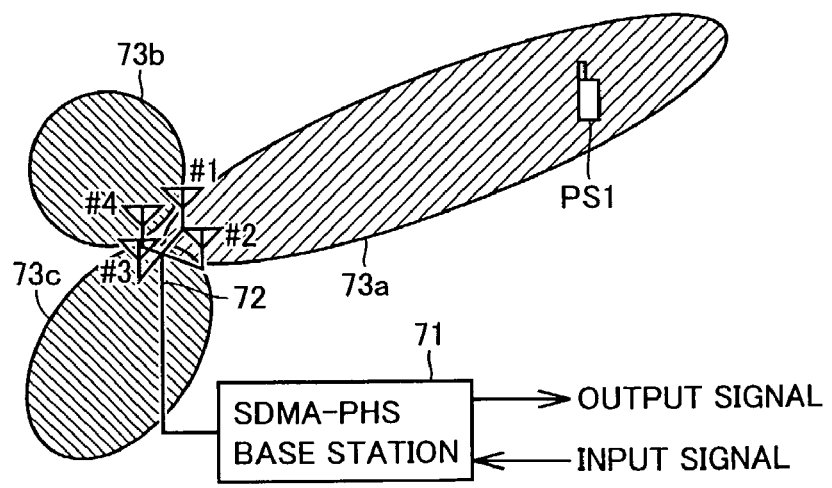
FIG. 14 conceptually shows radio wave directivity provided when an SDMA-P base station 71 is transmitting data to or from a PHS terminal PS1.
Figure 15:
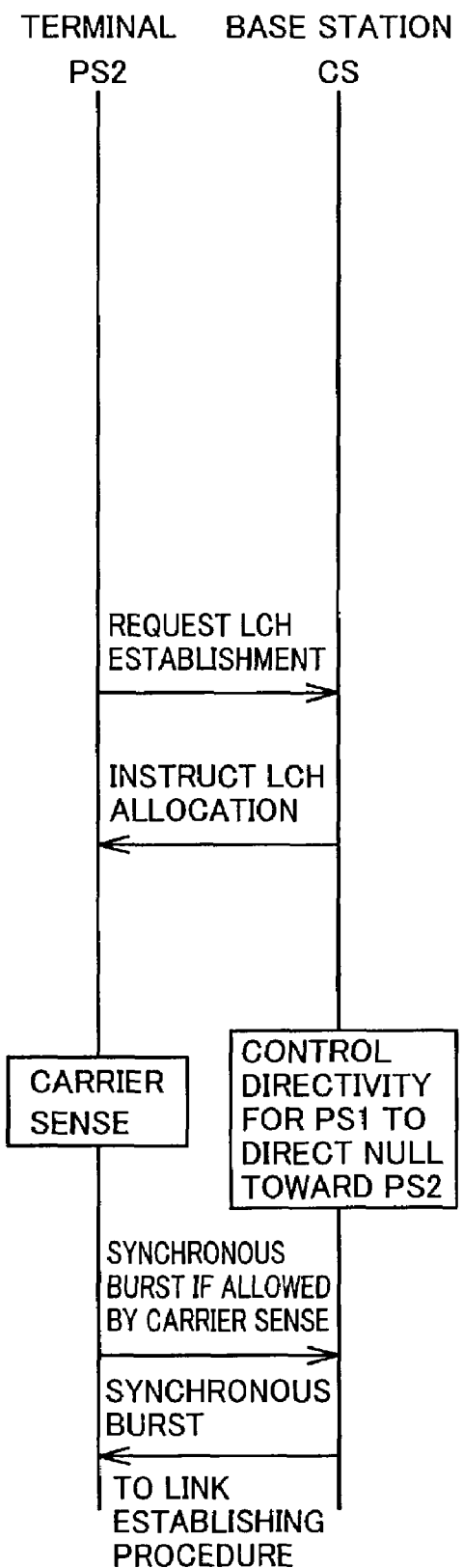
FIG. 15 illustrates a flow of control sequence for directing a null direction of a radio wave area toward a new-call.
Figure 16A:
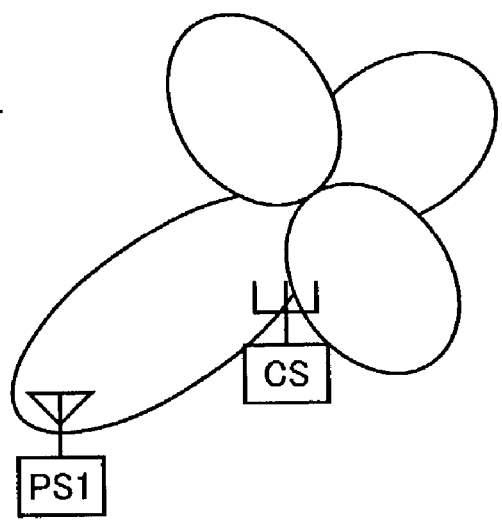
FIGS. 16A-16C conceptually show directivity of a radio wave area extending from a base station CS to existing-call PS1.
Figure 16B:
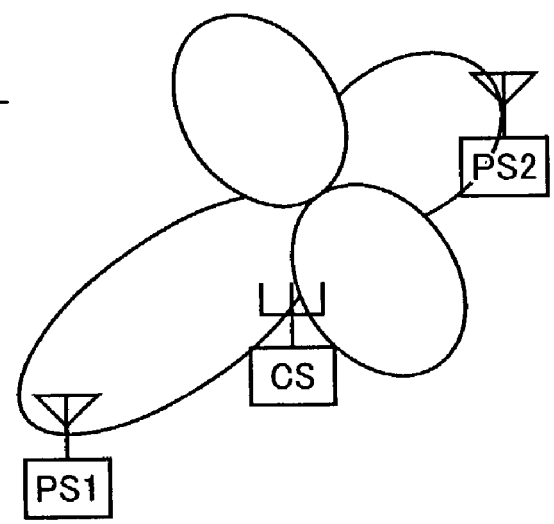
Figure 16C:
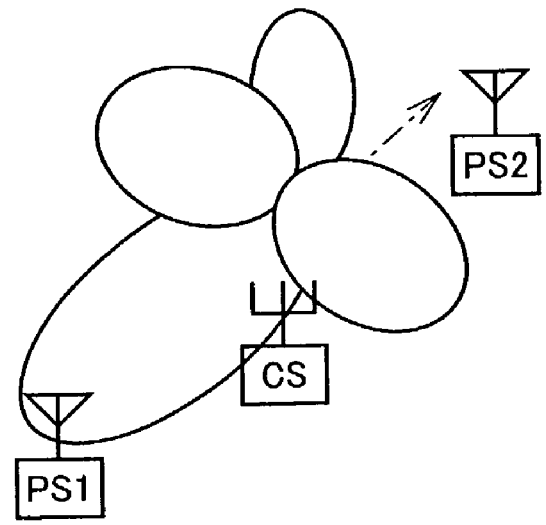

FIG. 11 is a flowchart illustrating such sending power control processing of the seventh embodiment.

Referring to FIG. 11, when the new-call requests the channel allocation (step S500), SDMA base station 1 reads out the receiving level of radio wave, which is emitted from existing-call, from the memory, and substitutes the read value in variable RSSI_GIVEN (step S402).

Subsequently, SDMA base station 1 measures the receiving level of radio wave emitted from new-call, and substitutes the measured value in variable RSSI_NEW (step S504).

Then, SDMA base station 1 compares the value of variable RSSI_NEW with a predetermined value (step S506), and performs a new processing step S508 for changing the sending power for the existing-call if the receiving level of radio wave emitted from the new-call is larger than the predetermined value.

Thus, SDMA base station 1 calculates level P_Down (dB), by which the level is to be lowered, in accordance with the following formula (step S508) from receiving level RSSI_NEW of radio wave emitted from the new-call, receiving level RSSI_GIVEN of radio wave emitted from the existing-call and the power difference D_Power between up and down of the system:

$$P\_Down = D\_Power + RSSI\_NEW - 44 + (Margin + (RSSI_{13\ NEW\_RSSI} - GIVEN)/\square) \quad (4)$$

Power difference D_Power between up and down of the system is specified depending on the system and is equal, e.g., to 17 dB. The predetermined level is specified depending on the system and is equal to, e.g., 44 dBµV.

The value of margin Margin is appropriately determined depending on the system and is equal, e.g., to 5 dB. The factor $\square$ can be equal, e.g., to 2.

Similarly to the second embodiment, it is possible in the seventh embodiment to add the processing of controlling the sending directivity of the existing-call to direct the null point toward the new-call. Thereby, an influence on the new-call by the interference wave can be suppressed more effectively.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A radio apparatus comprising:
   an array antenna (2) provided with a plurality of antennas; and
   an adaptive array send control portion (20) for controlling a send signal applied to each of said antennas and performing special multiplex communication with a plurality of terminals, wherein
   said adaptive array send control portion lowers an intensity of a radio wave emitted to a first terminal (PS1) for a predetermined period when a second terminal (PS2) requests a connection with said radio apparatus while communication with said first terminal is being performed by said radio apparatus.

2. The radio apparatus according to the claim 1, wherein said adaptive array send control portion lowers the intensity of the radio wave emitted to said first terminal by a predetermined level for a predetermined period in response to detection of the fact that a receiving level of a radio wave emitted from said second terminal is larger than a predetermined level when said second terminal requests the connection with said radio apparatus.

3. The radio apparatus according to the claim 1, wherein said adaptive array send control portion lowers the intensity of the radio wave emitted to said first terminal by a level corresponding to a receiving level of a radio wave emitted from said second terminal for a predetermined period in response to detection of the fact that the receiving level of radio wave emitted from said second terminal is larger than a predetermined level when said second terminal requests the connection with said radio apparatus.

4. The radio apparatus according to the claim 1, wherein said adaptive array send control portion lowers the intensity of the radio wave emitted to said first terminal by a level corresponding to a receiving level of a radio wave emitted from said first terminal for a predetermined period when said second terminal requests the connection with said radio apparatus.

5. The radio apparatus according to the claim 1, wherein said adaptive array send control portion lowers the intensity of the radio wave emitted to said first terminal by a level corresponding to a receiving level of a radio wave emitted from said first terminal for a predetermined period in response to detection of the fact that a receiving level of a radio wave emitted from said second terminal is larger than a predetermined level when said second terminal requests the connection with said radio apparatus.

6. The radio apparatus according to the claim 1, wherein said adaptive array send control portion lowers the intensity of the radio wave emitted to said first terminal by a level corresponding to receiving levels of radio waves emitted from said first and second terminals for a predetermined period in response to detection of the fact that the receiving level of radio wave emitted from said second terminal is larger than a predetermined level when said second terminal requests the connection with said radio apparatus.

7. The radio apparatus according to claim 1, wherein said adaptive array send control portion operates to direct a null direction of a radio wave sent to said first terminal toward said second terminal when said second terminal requests the connection with said radio apparatus.

8. An antenna directivity control method of a radio apparatus comprising the steps of:
controlling a send signal to be applied to each of a plurality of antennas of an array antenna, and establishing a send/receive channel in special multiplex communication with respect to a first terminal;
lowering an intensity of a radio wave emitted to said first terminal for a predetermined period during measuring of an interference wave by said second terminal when said second terminal requests a connection with said radio apparatus while send/receive with respect to said first terminal is being performed by said radio apparatus (step S12); and
establishing the send/receive channel in special multiplex communication with respect to said second terminal by controlling a send signal to be applied to each of said plurality of antennas in accordance with a result of the measurement of the interference wave by said second terminal.

9. The antenna directivity control method according to the claim 8, wherein
said step of lowering the intensity of the radio wave emitted to said first terminal for a predetermined period includes the step (S106) of lowering the intensity of the radio wave emitted to said first terminal by a predetermined level in response to detection of the fact that a receiving level of a radio wave emitted from said second terminal is larger than a predetermined level when said second terminal requests the connection with said radio apparatus.

10. The antenna directivity control method according to the claim 8, wherein
said step of lowering the intensity of the radio wave emitted to said first terminal for a predetermined period includes the step (S208) of lowering the intensity of the radio wave emitted to said first terminal by a level corresponding to a receiving level of a radio wave emitted from said second terminal in response to detection of the fact that the receiving level of radio wave emitted from said second terminal is larger than a predetermined level when said second terminal requests the connection with said radio apparatus.

11. The antenna directivity control method according to the claim 8, wherein
said step of lowering the intensity of the radio wave emitted to said first terminal for a predetermined period includes the step (S304) of lowering the intensity of the radio wave emitted to said first terminal by a level corresponding to a receiving level of a radio wave emitted from said first terminal when said second terminal requests the connection with said radio apparatus.

12. The antenna directivity control method according to the claim 8, wherein
said step of lowering the intensity of the radio wave emitted to said first terminal for a predetermined period includes the step (S408) of lowering the intensity of the radio wave emitted to said first terminal by a level corresponding to a receiving level of a radio wave emitted from said first terminal in response to detection of the fact that a receiving level of a radio wave emitted from said second terminal is larger than a predetermined level when said second terminal requests the connection with said radio apparatus.

13. The antenna directivity control method according to the claim 8, wherein
said step of lowering the intensity of the radio wave emitted to said first terminal for a predetermined period includes the step (S508) of lowering the intensity of the radio wave emitted to said first terminal by a level corresponding to receiving levels of radio waves emitted from said first and second terminals in response to detection of the fact that the receiving level of radio wave emitted from said second terminal is larger than a predetermined level when said second terminal requests the connection with said radio apparatus.

14. The antenna directivity control method according to the claim 8, wherein
said step of lowering the intensity of the radio wave emitted to said first terminal for a predetermined period includes the step (S12') of directing a null direction of the radio wave emitted to said first terminal toward said second terminal when said second terminal requests the connection with said radio apparatus.

* * * * *